L. B. ANDERSON.
DRAFTING INSTRUMENT.
APPLICATION FILED SEPT. 10, 1913.
1,098,210.
Patented May 26, 1914.
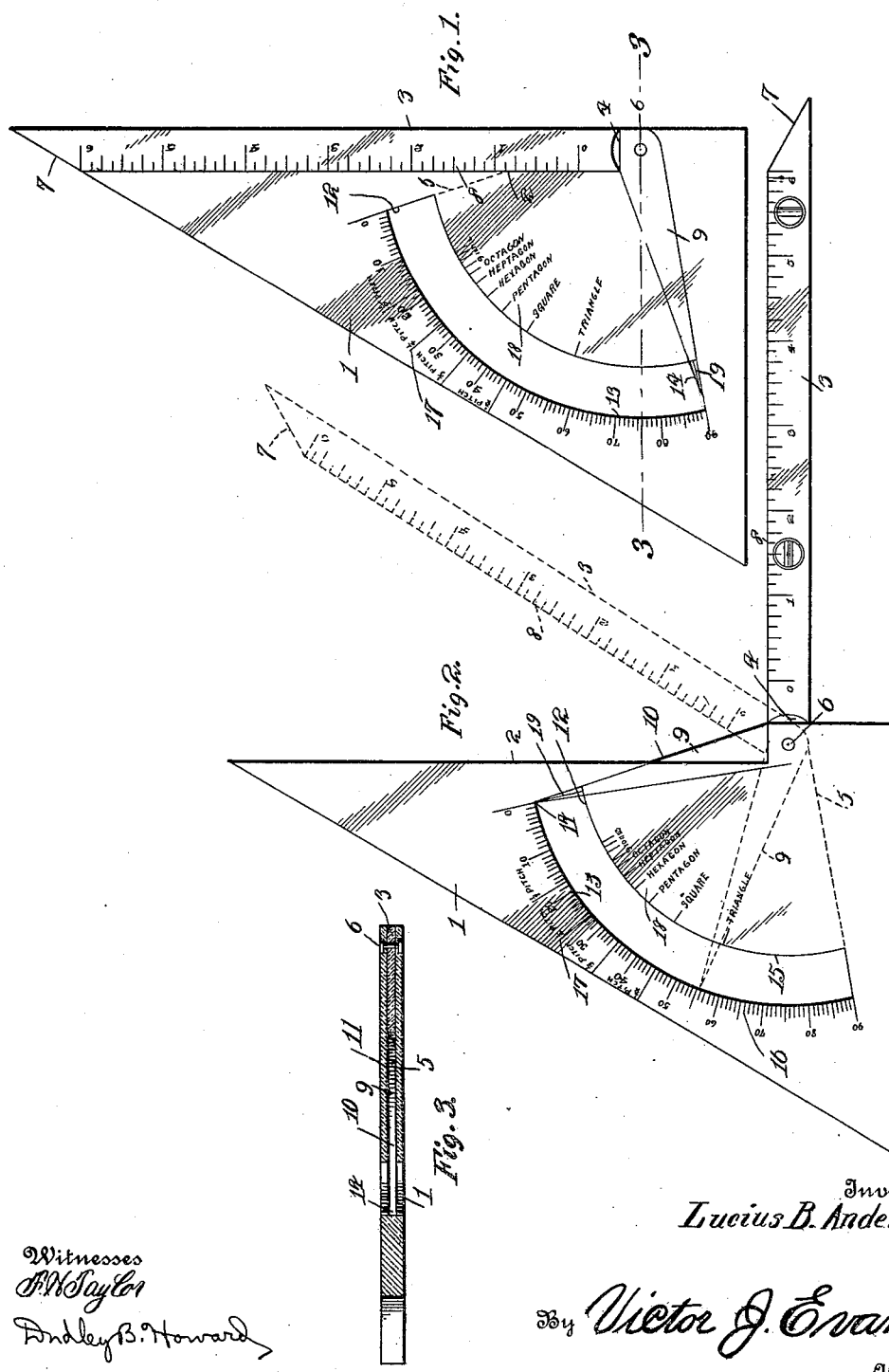
Inventor
Lucius B. Anderson
By Victor J. Evans
Attorney
Witnesses
F. W. Taylor
Dudley B. Howard

UNITED STATES PATENT OFFICE.

LUCIUS B. ANDERSON, OF LOGAN, UTAH, ASSIGNOR TO NOAH B. PRYOR, OF LOGAN, UTAH.

DRAFTING INSTRUMENT.

1,098,210.  Specification of Letters Patent.  Patented May 26, 1914.

Application filed September 10, 1913. Serial No. 789,176.

*To all whom it may concern:*

Be it known that I, LUCIUS B. ANDERSON, a citizen of the United States, residing at Logan, in the county of Cache and State of Utah, have invented new and useful Improvements in Drafting Instruments, of which the following is a specification.

This invention relates to a drafting instrument for use by engineers, architects, and draftsmen in general.

In carrying out my invention it is my object to provide a triangle for use in laying off angles with an adjustable arm, by which angles of any desired degree may be determined.

A further object of the invention is to provide a device of this character wherein the body of the triangle is cut away adjacent to one of its edges and the angularly adjustable arm is pivoted within the recess thus formed and is shaped so that it will fit therein to complete the area of the triangle when in its innermost, inoperative position.

A still further object is the provision of readily operable and accurate means for determining the angular adjustment of the movable arm of the device, which includes a pointer attached fixedly to the movable arm and which is movable through a confining slot within the body of the triangle, so that the device may be placed upon either of its side faces upon a drawing board and will lie flat thereon owing to the absence of any obstructing projections from the device, it being understood that the flat side faces of the movable arm lie in the respective planes of the side faces of the triangle body at all times. The slot for the reception of the indicating pointer is constructed so that its extreme walls will serve as means for engagement with the pointer to limit the movement of the movable arm, whereby the said arm may be made to assume either of its extreme positions parallel to the adjacent side edge of the triangle body in a quick and convenient manner.

The invention consists in the features of construction, combination and arrangement of parts, hereinafter fully described and claimed, reference being had to the accompanying drawings, in which:

Figure 1 is a top plan view of the device, showing the movable arm in its closed position; Fig. 2 is a similar view showing the arm in extended position, another one of its angularly adjusted positions being indicated by the dotted lines; and, Fig. 3 is a transverse sectional view taken on line 3—3 of Fig. 1.

In the drawing, the numeral 1 designates the body of the triangle which is constructed of celluloid or other transparent material in the usual manner. The said body has one of its base edges cut away as at 2, so that the longitudinal wall of the recess thus formed is parallel to the said edge. A movable arm 3, which latter has its inner end reduced in thickness as at 4 for reception within the sector-shaped slot 5 provided within the body 1, is pivoted thereto by means of the pivot pin 6 and is adapted, when in its closed position to fill the said recess in the triangle body so as to complete the triangle, the free end of the said arm being beveled inwardly as at 7 for this purpose. The inner edge 8 of the movable arm is graduated to form a linear scale for use in obtaining longitudinal measurements in connection therewith.

The slot 5 in the body 1 is disposed medially within the said body in spaced relation to its broad side faces and is adapted for the reception of a pointer 9 which is formed on the reduced inner end portion 4 of the movable arm 3 for movement therewith. The side edges 10 of this pointer are adapted for engagement with the respective side edges 11 of the slot 5 so as to limit the movement of the arm 3 in either direction, wherein it will be held checked upon arrival into exactly parallel relation to one of the base edges of the triangle body. An arcuate slot 12 extends completely through the body 1 in communication with the pointer-confining slot 5 and is disposed concentric with respect to the pivot 6 with its outer curved edge 13 engageable with the free end 14 of the pointer 9, its edge 15 being disposed inwardly with respect to the pointer extremity. Each side face of the triangle body is graduated adjacent to the edge 13 of the slot 12 for coöperation with the extremity 14 of the pointer, and as shown in the drawing, a degree scale 16 extends inwardly from one end of the slot and a scale 17 by which the pitch of a roof may be determined is provided adjacent to its other end. The side faces of the body 1 are also graduated adjacent to the inner edge of the slot 12 as indicated at 18 for coöperation with a longitudinal, medially disposed indicator 19 inscribed upon the exposed extremity of the pointer 9 in setting the arm 3 for use in laying off the sides of different polygons. Those portions of the side of the body 1 between which the slot 5 is provided may be compressed slightly so that they will engage the pointer 9 with considerable friction and will thus serve to secure the latter in its different adjusted positions.

As should be understood readily, the device as a whole may be laid flat upon a drawing board with either of its side faces in contact therewith and with one of its base edges engaged with a T-square, irrespective of the angular position of the arm 3, for use in the various capacities set forth in describing the scale used in connection with the pointer 9.

The capabilities of the device should be clearly apparent to those skilled in the arts to which this invention appertains and further description of the same is unnecessary.

Having thus described my invention, what I claim is:

1. A drafting instrument of the class described comprising a triangle body, having one of its base edges recessed, an arm pivoted to the body and adapted for reception within said recess to complete the form of the triangle, the said body being provided with a sector-shaped slot spaced from its side faces and communicating with the said recess, and a pointer provided upon the arm and adapted to be confined within the said slot for movement therethrough, the body being provided with an arcuate scale for coöperation with the pointer.

2. A drafting instrument of the class described comprising a triangle body, having one of its edges recessed, an arm pivoted to the body and adapted for reception within said recess to complete the form of the triangle, the said body being provided with a sector-shaped slot spaced from its side faces and communicating with the said recess, and a pointer provided upon the arm and adapted to be confined within the said slot for movement therethrough, the said body being provided with an arcuate slot concentric with the pivot of the said arm and communicating with the sector-shaped slot for exposing the free end of the pointer and a scale being provided at the outer edge of the arcuate slot for coöperation with the pointer.

3. A drafting instrument of the class described comprising a triangle body, having one of its base edges recessed, an arm pivoted to the body and adapted for reception within the said recess to complete the form of the triangle, the said body being provided with a sector-shaped slot spaced from its side faces and communicating with the said recess, and a pointer provided upon the arm and adapted to be confined within the said slot for movement therethrough, the said body being provided with an arcuate slot concentric with the pivot of the said arm and communicating with the sector-shaped slot for exposing the free end of the pointer, the exposed end of the pointer being provided with a medial longitudinal line and the inner edge of the arcuate slot being provided with a scale for coöperation therewith.

In testimony whereof I affix my signature in presence of two witnesses.

LUCIUS B. ANDERSON.

Witnesses:
CHARLES ENGLAND,
JESSE EARL.

Copies of this patent may be obtained for five cents each, by addressing the "Commissioner of Patents, Washington, D. C."